(12) United States Patent
Mejeoumov et al.

(10) Patent No.: US 10,372,671 B2
(45) Date of Patent: Aug. 6, 2019

(54) CONFIGURATION MANAGEMENT OF INDUSTRIAL DATA

(71) Applicant: Rockwell Automation Technologies, Inc., Mayfield Heights, OH (US)

(72) Inventors: Gleb Mejeoumov, Orange Park, FL (US); James Bartee, Stilesville, IN (US); Ronald D. Glowka, Manchaca, TX (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 354 days.

(21) Appl. No.: 14/506,355

(22) Filed: Oct. 3, 2014

(65) Prior Publication Data

US 2016/0098415 A1 Apr. 7, 2016

(51) Int. Cl.
*G06F 16/13* (2019.01)
*G06F 16/22* (2019.01)
*G06F 17/22* (2006.01)
*G06F 17/24* (2006.01)

(52) U.S. Cl.
CPC .......... *G06F 16/13* (2019.01); *G06F 16/2246* (2019.01); *G06F 16/2282* (2019.01); *G06F 17/2241* (2013.01); *G06F 17/246* (2013.01)

(58) Field of Classification Search
None
See application file for complete search history.

(56) References Cited

U.S. PATENT DOCUMENTS

| 5,038,318 | A | 8/1991 | Roseman | |
|---|---|---|---|---|
| 7,103,452 | B2 | 9/2006 | Retsina | |
| 7,703,007 | B2 * | 4/2010 | Collie | G06F 17/2229 715/212 |
| 2006/0235882 | A1 * | 10/2006 | Mateescu | H04L 29/06027 |
| 2009/0144109 | A1 * | 6/2009 | Knight | G06Q 10/08 705/334 |
| 2010/0082669 | A1 * | 4/2010 | Obitko | G05B 21/02 707/770 |
| 2011/0239109 | A1 * | 9/2011 | Nixon | G06F 17/2247 715/236 |
| 2015/0205775 | A1 * | 7/2015 | Berdahl | G06F 3/04842 715/255 |

OTHER PUBLICATIONS

European Office Action for European Application Serial No. 15150725.8 dated Jan. 28, 2015, 3 pages.
European Search Report for European Application Serial No. 15150725.8 dated Apr. 20, 2016, 9 pages.
European Office Action for European Application Serial No. 15150725.8 dated May 23, 2016, 2 pages.

* cited by examiner

*Primary Examiner* — Tuankhanh D Phan
*Assistant Examiner* — Tuan-Khanh Phan
(74) *Attorney, Agent, or Firm* — Amin, Turocy & Watson, LLP

(57) ABSTRACT

Systems and techniques for storing, managing and/or displaying industrial data are presented. A controller component stores configuration data associated with a plurality of product types for a product generated based on at least one manufacturing process in a nested data structure. A data interface component manages data corresponding to the configuration data stored in the nested data structure for a data table associated with a spreadsheet application.

20 Claims, 12 Drawing Sheets

FIG. 3

Instructions (rows 1-3):
1) Press "Read Values" first to update the table below with the current values
2) Change the desired recipe limits / targets and press "Write Values"
3) Press "Read Values" again to confirm that the new values were accepted

[Button: Read Values] [Button: Write Values]

| # | Variable | | Grade | CFA | BK | A59 | D23 | 45R | E0020 | K0120 | G0160 | D2700 | P55 | S15 (Blend) | 45Q (Optisorter) | G0074 (Product) | E0219 (Fryer) | B91 (Freezer) | J0030 |
|---|---|---|---|---|---|---|---|---|---|---|---|---|---|---|---|---|---|---|
| | | | Grade | 0 | 1 | 2 | 3 | 4 | 5 | 6 | 7 | 8 | 9 | 10 | 11 | 12 | 13 | 14 | 15 |
| 48 | Prod_TotalDefects | | MAX | 30 | 48 | 15 | 40 | 48 | 35 | 36 | 38 | 45 | 40 | 30 | 34 | 48 | 48 | 45 | 63 |
| 49 | Prod_CriticalDefects | | MAX | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| 50 | Prod_MajorDefects | | MAX | 4 | 7 | 5 | 6 | 7 | 6 | 5 | 7 | 7 | 6 | 6 | 7 | 7 | 7 | 7 | 11 |
| 51 | Prod_MinorDefects | | MAX | 24 | 41 | 10 | 34 | 41 | 29 | 31 | 31 | 38 | 34 | 24 | 27 | 41 | 41 | 38 | 52 |
| 52 | Prod_Color | | TGT | 62 | 61 | 38 | 27 | 46 | 27 | 38 | 62 | 29 | 62 | 60 | 16 | 15 | 52 | 29 | 62 |
| 53 | Prod_Salt | | TGT | 0.5 | 0.3 | 1 | 1.1 | 0.8 | 1.1 | 1.4 | 0.8 | 1 | 0.7 | 0.8 | 0.8 | 0.8 | 0.6 | 1 | 0.8 |
| 54 | Prod_Solids | | TGT | 35 | 35.5 | 38 | 38 | 35 | 35 | 37 | 38 | 36 | 36.5 | 32 | 35 | 40 | 36 | 38 | 38 |
| 55 | Prod_Solids | | MIN | 34 | 34 | 34 | 34 | 32 | 32 | 33 | 34 | 30 | 34.7 | 28 | 32 | 38 | 34 | 34 | 34 |
| 56 | Prod_Texture | | MAX | 5 | 1.5 | 3 | 2 | 1.5 | 1.5 | 2 | 1.5 | 2 | 1.5 | 1.5 | 1.5 | 1.5 | 1.5 | 2 | 1.5 |
| 57 | Prod_Texture_BK | | MAX | 2.5 | 0 | 0 | 0 | 0 | 0 | 0 | 0 | 0 | 0 | 0 | 0 | 0 | 0 | 0 | 0 |
| 58 | Prod_ColorVar | | MAX | 4 | 4 | 10 | 8 | 5 | 8 | 10 | 4 | 6 | 6 | 6 | 5 | 10 | 8 | 8 | 4 |
| 59 | Prod_ColorVar_SE | | MAX | 1.5 | 1.5 | 3 | 2 | 1.5 | 3 | 3 | 1.5 | 2.5 | 1.5 | 2 | 1.5 | 2.5 | 2 | 3 | 1.5 |
| 60 | Prod_ColorVar_ST | | MAX | 2 | 3 | 1.5 | 2 | 2.5 | 3 | 6 | 1.5 | 5 | 3 | 4 | 1.5 | 5 | 2 | 3.5 | 4 |
| 61 | Prod_Rate | | MAX | 49 | 48 | 30 | 32 | 34 | 24 | 28 | 48 | 34 | 46 | 36 | 32 | 26 | 32 | 34 | 46 |
| 62 | Prod_Rate | | MIN | 25 | 25 | 15 | 15 | 15 | 14 | 16 | 25 | 15 | 25 | 20 | 15 | 16 | 20 | 20 | 25 |
| 63 | Blancher_Temp_1 | | MAX | 170 | 180 | 180 | 170 | 170 | 170 | 168 | 180 | 170 | 180 | 168 | 170 | 168 | 168 | 170 | 180 |
| 64 | Blancher_Temp_1 | | MIN | 162 | 162 | 170 | 162 | 162 | 162 | 162 | 162 | 162 | 162 | 162 | 162 | 162 | 162 | 162 | 162 |
| 65 | Blancher_ResTime | | MAX | 20 | 20 | 20 | 18 | 18 | 18 | 18 | 18 | 18 | 20 | 18 | 18 | 20 | 20 | 18 | 20 |
| 66 | Blancher_ResTime | | MIN | 12 | 12 | 16 | 12 | 12 | 12 | 12 | 12 | 12 | 12 | 12 | 12 | 12 | 12 | 12 | 12 |
| 67 | Sugar_Flow | | MAX | 35 | 35 | 35 | 35 | 35 | 35 | 35 | 35 | 35 | 35 | 35 | 35 | 35 | 35 | 35 | 35 |
| 68 | Sugar_Flow | | MIN | 10 | 10 | 10 | 10 | 10 | 10 | 10 | 10 | 10 | 10 | 10 | 10 | 10 | 10 | 10 | 10 |
| 69 | Salt_Flow | | MAX | 4.5 | 4.5 | 3.5 | 4.5 | 4.5 | 4.5 | 4.5 | 4.5 | 4.5 | 4.5 | 4.5 | 4.5 | 4.5 | 4.5 | 4.5 | 4.5 |
| 70 | Salt_Flow | | MIN | 2.5 | 2.5 | 0.5 | 2.5 | 2.5 | 2.5 | 2.5 | 2.5 | 2.5 | 2.5 | 2.5 | 2.5 | 2 | 2.5 | 2.5 | 2.5 |
| 71 | Dryer_Evap_Rate | | MAX | 250 | 250 | 250 | 250 | 250 | 250 | 250 | 250 | 250 | 250 | 250 | 250 | 250 | 250 | 250 | 250 |
| 72 | Dryer_Evap_Rate | | MIN | 150 | 150 | 150 | 150 | 150 | 150 | 150 | 150 | 150 | 150 | 150 | 150 | 150 | 150 | 150 | 150 |
| 73 | Fryer_ParFry_Color_1 | | TGT | 62 | 50 | 50 | 50 | 50 | 50 | 50 | 50 | 50 | 50 | 50 | 50 | 50 | 50 | 50 | 50 |
| 74 | Fryer_ParFry_Color_2 | | TGT | 50 | 50 | 50 | 50 | 50 | 50 | 50 | 50 | 50 | 50 | 50 | 50 | 50 | 50 | 50 | 50 |
| 75 | Fryer_A2_Temp | | MAX | 377 | 380 | 385 | 380 | 380 | 380 | 380 | 380 | 380 | 380 | 380 | 380 | 385 | 380 | 380 | 380 |
| 76 | Fryer_A2_Temp | | MIN | 370 | 376 | 380 | 376 | 376 | 376 | 376 | 376 | 376 | 376 | 376 | 376 | 380 | 376 | 376 | 376 |
| 77 | Fryer_A1_ResTime | | MAX | 20 | 20 | 40 | 18 | 20 | 22 | 20 | 20 | 18 | 22 | 22 | 20 | 20 | 22 | 20 | 20 |
| 78 | Fryer_A1_ResTime | | MIN | 12 | 16 | 20 | 12 | 14 | 14 | 16 | 14 | 12 | 14 | 14 | 14 | 28 | 14 | 14 | 16 |
| 79 | Fryer_A2_ResTime | | MAX | 40 | 32 | 66 | 30 | 30 | 32 | 30 | 30 | 32 | 42 | 34 | 30 | 70 | 30 | 30 | 32 |
| 80 | Fryer_A2_ResTime | | MIN | 26 | 26 | 36 | 22 | 24 | 22 | 24 | 24 | 22 | 26 | 26 | 24 | 50 | 24 | 24 | 26 |

| Name | | Value | Force Mask | Style | Data Type |
|---|---|---|---|---|---|
| ⊟-Lgx_CM_Grade | | {...} | {...} | | CM_Grade[50] |
| ⊟-Lgx_CM_Grade[0] | | {...} | {...} | | CM_Grade |
| ⊞-Lgx_CM_Grade[0].CVs | | {...} | {...} | | CM_All_CVs |
| ⊟-Lgx_CM_Grade[0].MVs. | | {...} | {...} | | CM_All_MVs |
| ⊞-Lgx_CM_Grade[0].MVs.Evenflows | | {...} | {...} | | CM_MV[5] |
| ⊞-Lgx_CM_Grade[0].MVs.Optisorter_Spot_Size | | {...} | {...} | | CM_MV |
| ⊟-Lgx_CM_Grade[0].MVs.Prod_Rate | | {...} | {...} | | CM_MV |
| ⊞-Lgx_CM_Grade[0].MVs.Prod_Rate.Name | | ' ' | | | STRING |
| -Lgx_CM_Grade[0].MVs.Prod_Rate.MAX | | 49.0 | | Float | REAL |
| -Lgx_CM_Grade[0].MVs.Prod_Rate.MIN | | 25.0 | | Float | REAL |
| -Lgx_CM_Grade[0].MVs.Prod_Rate.MS | | 10.0 | | | REAL |
| -Lgx_CM_Grade[0].MVs.Prod_Rate.Max_Incr | | 0.5 | | Float | REAL |
| -Lgx_CM_Grade[0].MVs.Prod_Rate.Max_Decr | | 0.5 | | Float | REAL |
| ⊞-Lgx_CM_Grade[0].MVs.Blancher_Temp_1 | | {...} | {...} | | CM_MV |
| ⊞-Lgx_CM_Grade[0].MVs.Blancher_ResTime | | {...} | {...} | | CM_MV |
| ⊞-Lgx_CM_Grade[0].MVs.Sugar_Flow | | {...} | {...} | | CM_MV |
| ⊞-Lgx_CM_Grade[0].MVs.Salt_Flow | | {...} | {...} | | CM_MV |
| ⊞-Lgx_CM_Grade[0].MVs.Dryer_Evap_Rate | | {...} | {...} | | CM_MV |
| ⊞-Lgx_CM_Grade[0].MVs.Fryer_A2_Temp | | {...} | {...} | | CM_MV |
| ⊞-Lgx_CM_Grade[0].MVs.Fryer_A1_ResTime | | {...} | {...} | | CM_MV |
| ⊞-Lgx_CM_Grade[0].MVs.Fryer_A2_ResTime | | {...} | {...} | | CM_MV |
| ⊞-Lgx_CM_Grade[0].MVs.Freezer_FreezerResT | | {...} | {...} | | CM_MV |
| ⊞-Lgx_CM_Grade[0].MVs.Freezer_PrecoolResT | | {...} | {...} | | CM_MV |
| ⊞-Lgx_CM_Grade[1] | | {...} | {...} | | CM_Grade |
| ⊞-Lgx_CM_Grade[2] | | {...} | {...} | | CM_Grade |
| ⊞-Lgx_CM_Grade[3] | | {...} | {...} | | CM_Grade |
| ⊞-Lgx_CM_Grade[4] | | {...} | {...} | | CM_Grade |

FIG. 4

CONFIGURATION MANAGEMENT OF INDUSTRIAL DATA

BACKGROUND

The subject matter disclosed herein relates generally to configuration management of industrial data, and, more particularly, to storing, managing and/or displaying industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes a controller component and a data interface component. The controller component is configured to store configuration data associated with a plurality of product types for a product generated based on at least one manufacturing process in a nested data structure. The data interface component is configured to manage data corresponding to the configuration data stored in the nested data structure for a data table associated with a spreadsheet application.

One or more embodiments also provide a method for storing, by a device comprising at least one processor, process data associated with a plurality of processing requirements for a product that is generated using at least one industrial device in a hierarchical data structure, and for providing, by the device, a spreadsheet application that displays data corresponding to the process data stored in the hierarchical data structure access to the hierarchical data structure.

Also, according to one or more embodiments, a non-transitory computer-readable medium is provided having stored thereon instructions that, in response to execution, cause a device comprising a processor to perform operations, the operations comprising storing industrial data associated with a plurality of product types for a product that is generated using at least one industrial device in a hierarchical data structure, and managing tabular data of a spreadsheet application that displays data corresponding to the industrial data stored in the hierarchical data structure as a function of at least the plurality of product types.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 3 is an exemplary data table of a spreadsheet application.

FIG. 4 is an exemplary nested data structure.

DETAILED DESCRIPTION

Figure 1:
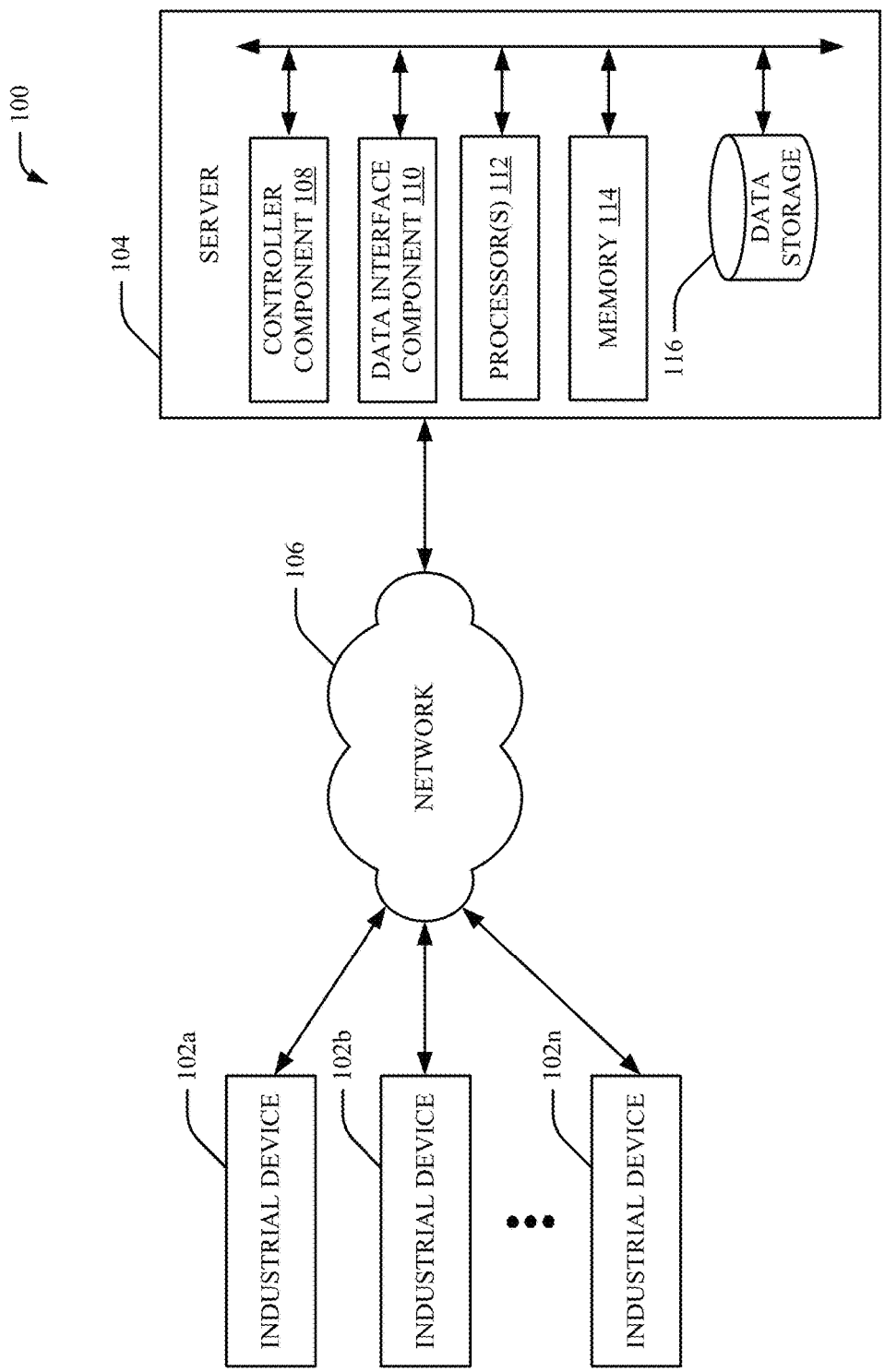
FIG. 1 is an overview of a system that facilitates configuration management of industrial data.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and associated input/output (I/O) devices are central to the operation of modem automation systems. These controllers interact with industrial devices on the plant floor of a plant facility (e.g., an industrial facility) to control automated processes relating to such objectives as product manufacture, product processing, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and/or controlled, industrial automation systems often generate vast amounts of data. In addition to production statistics, data relating to machine health, alarm statuses, operator feedback (e.g., manually entered reason codes associated with a downtime condition), electrical or mechanical load over time, and the like are often monitored and/or recorded. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. The amount of generated automation data can further increase due to the fact that many industrial facilities operate during more than one work shift (e.g., more than 8 hours per day) and/or that generated automation data can be associated with multiple industrial facilities.

The large quantity of data generated by modern automation systems makes it possible to apply a broad range of plant statistics and/or plant analytics to automation systems and processes that make up an industrial enterprise or business. However, it is often difficult for a user to manage, review, analyze and/or visualize the large quantity of data generated by modern automation systems. Moreover, it is often difficult for a user without an automation background and/or with limited knowledge of automation systems to understand formatting of a data structure associated with the large quantity of data generated by modern automation systems. Conventional modern automation systems also only allow information associated with a single product and/or a single product grade to be viewed and/or edited by a user.

To address these and other issues, one or more embodiments of the present disclosure facilitate storing, managing and/or displaying data (e.g., industrial data, configuration data, process data, recipe data, etc.) associated with at least one manufacturing process. The data can be stored in a nested data structure (e.g., an array-type nested tag) associated with a controller (e.g., an industrial controller). A spreadsheet application can provide a tabular view of the data via a spreadsheet data table where, for example, information associated with products and/or product grades can be arranged in columns and configuration parameters can be arranged in rows of the spreadsheet data table. In an aspect, a configuration manager (e.g., a configuration manager associated with a data interface driver) and/or the spreadsheet application can provide access to the nested data structure from a user device (e.g., a user workstation device). The user device can access (e.g., locally access or remotely access) the nested data structure via at least one server associated with the controller and the configuration manager, via a local network (e.g., an internal network) and/or via a network communication protocol (e.g., an Ethernet communication protocol, etc.).

FIG. 1 illustrates an example system 100 for managing configuration of data associated with at least one manufacturing process (e.g., at least one industrial process). System 100 includes one or more industrial devices 102a-n and a server 104. In one example, the server 104 can be implemented as an advance process control server. It is to be appreciated that the server 104 can be implemented as one or more servers. The industrial devices 102a-n and/or the server 104 can be associated with one or more industrial facilities (e.g., one or more plant facilities). For example, the industrial devices 102a-n can be associated with one or more automation systems (e.g., one or more industrial control systems) operating within the one or more industrial facilities. The industrial devices 102a-n of the one or more automation systems can facilitate one or more manufacturing processes. The one or more manufacturing processes can generate at least one product (e.g., at least one final product, at least one good, at least one asset, etc.).

Multiple product types (e.g., multiple product grades) can be associated with at least one product generated by the one or more manufacturing processes (e.g., using the industrial devices 102a-n). A product type (e.g., a product grade) of a generated product can be associated with a set of property requirements, a set of processing requirements and/or a set of tuning parameters (e.g., a set of solution configurations). Moreover, a product type (e.g., a product grade) can be accomplished by adhering to a process recipe associated with configuration data. Each product type associated with the industrial devices 102a-n (e.g., each product generated by the industrial devices 102a-n) can be associated with a unique set of property requirements, processing requirements, tuning data and/or configuration data. Configuration data can include, for example, specific process constraints (e.g., process variable constraints, temperature constraints, pressure constraints, etc.), specific process targets and/or other process data. In one example, configuration data can be associated with an advance process control solution for one or more manufacturing processes.

A manufacturing process (e.g., an industrial process) can be a process of an industrial automation system in an industrial environment that includes, for example, an industrial process, a mixing process, an extruding process, an injection a molding process, a welding process, a melting process, a baking process, a stirring process, a measuring process, another process, etc. Exemplary automation systems (e.g., industrial automation systems in an industrial environment) can include, but are not limited to, batch control systems (e.g., mixing systems), continuous control systems (e.g., proportional-integral-derivative (PID) control systems), discrete control systems and/or other automation systems. Industrial devices 102a-n can include and/or be associated with such devices as an industrial tool (e.g., a manufacturing tool, a fabrication tool, etc.), an industrial chamber, industrial equipment, a roller, a station, a welder, a scanner, a belt conveyor, a boiler, a dryer, a scanner, a preheater, a precooler, a sorter, a cutter, a blancher, a fryer, a compressor, a steamer, a freezer, automation devices, industrial controllers (e.g., programmable logic controllers or other types of programmable automation controllers), field devices such as sensors and meters, motor drives, operator interfaces (e.g., human-machine interfaces, industrial monitors, graphic terminals, message displays, etc.), industrial robots, barcode markers, barcode readers, vision system devices (e.g., vision cameras), smart welders and/or other such industrial devices.

The server 104 can communicate (e.g., exchange data) with the one or more industrial devices 102a-n via a network 106. The network 106 can comprise a physical network (e.g., a physical local area network, hardwired I/O, etc.) and/or a wireless network (e.g., a wireless local area network, etc.). In one example, the network 106 can be implemented as a plant facility network (e.g., a process network of one or more plant facilities) such as, but not limited to, Ethernet/IP, Data Highway Plus, ControlNet, DeviceNet, or the like.

The server 104 can include a controller component 108, a data interface component 110, one or more processors 112 and/or a memory 114. In an alternate embodiment, the controller component 108 and the data interface component 110 can be implemented on different servers in communication via the network 106. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In various embodiments, one or more of the controller component 108, the data interface component 110, the one or more processors 112, and the memory 114 can be electrically and/or communicatively coupled to one another to perform one or more of the functions of the server 104. In some embodiments, the controller component 108 and the data interface component 110 can comprise software instructions stored on memory 114 and executed by processor(s) 112. The server 104 may also interact with other hardware and/or software components not depicted in FIG. 1. For example, processor(s) 112 may interact with one or more external user interface devices, such as a keyboard, a mouse, a display monitor, a touchscreen, or other such interface devices.

The controller component 108 can be implemented as an industrial controller (e.g., a programmable automation controller). The controller component 108 can facilitate design, configuration, monitoring and/or control of processes associated with the industrial devices 102a-n. For example, the controller component 108 can be configured for machine control, motion control, data processing, data storage, data management, etc. associated with the industrial devices 102a-n. The controller component 108 can store and execute user-defined control programs to effect decision-making in connection with controlled processes. Such user-defined control programs can include, but are not limited to, ladder logic, sequential function charts, function block diagrams, structured text, or other such programming structures. In accordance with various embodiments, the controller component 108 can be a dedicated piece of hardware that is self contained and/or implemented as a "soft controller" (e.g., a piece of software that runs on the server 104 and provides controller-like control). The data interface component 110 can be a configuration manager (e.g., configured for manufacturing operation management). The data interface component 110 can facilitate control and/or optimization of data and/or processes associated with the industrial devices 102a-n. For example, the data interface component 110 can be configured for data management, process management, model predictive control, model predictive intelligence, environmental management and/or production performance management of data associated with the industrial devices 102a-n.

The server 104 (e.g., the controller component 108) can receive any combination of digital and/or analog signals from the industrial devices 102a-n indicating a current state of the industrial devices 102a-n and/or associated processes (e.g., temperature, position, part presence or absence, pressure, fluid level, etc.). In an aspect, the controller component 108 and/or other controller(s) associated with the industrial devices 102a-n can execute a program (e.g., a user-defined control program) that performs automated decision-making for controlled processes based on the received signals. The controller component 108 and/or other controller(s) associated with the industrial devices 102a-n can then output appropriate digital and/or analog control signaling to the industrial devices 102a-n in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller component 108 and/or other controller(s) associated with the industrial devices 102a-n. Furthermore, the control program can comprise any suitable type of code used to control output signals generated by the controller component 108 and/or other controller(s) associated with the industrial devices 102a-n, including but not limited to ladder logic, sequential function charts, function block diagrams, structured text, or other such platforms. Accordingly, the controller component 108 and/or other controller(s) associated with the industrial devices 102a-n can be configured to monitor, control and/or collect data associated with the industrial devices 102a-n. The data monitored, controlled and/or collected by the controller component 108 can include historical data (e.g., alarm history, status history, trend data, etc.), live data values read from the industrial devices 102a-n, alarm data generated by the industrial devices 102a-n and/or other types of data associated with the industrial devices 102a-n.

Additionally, the controller component 108 can be configured to store data associated with the industrial devices 102a-n. The controller component 108 can store data associated with the industrial devices 102a-n in a nested data structure (e.g., a hierarchical data structure). For example, the controller component 108 can store configuration data for a product generated based on at least one manufacturing process (e.g., at least one manufacturing process associated with the industrial devices 102a-n) in a nested data structure (e.g., a nested data structure including hierarchical levels, nested groups, branches, etc.). The configuration data can be associated with a plurality of product types and/or product grades for a product generated based on at least one manufacturing process (e.g., at least one manufacturing process associated with the industrial devices 102a-n). A product type (e.g., a product grade) can be associated with configuration data (e.g., a set of variables, a set of tuning parameters, a set of configuration parameters, a set of recipe parameters, etc.) for at least one manufacturing process. Each product type from the plurality of product types can be associated with unique configuration data. Additionally, a product type can be associated with a set of property requirements and/or a set of processing requirements.

The nested data structure associated with the controller 108 can be an array-type nested data structure. The nested data structure can be formatted based on the plurality of product types for the product. For example, each product type of the plurality of product types can be associated with a branch (e.g., a hierarchical level) of the nested data structure. The nested data structure can store configuration data (e.g., one or more variables, one or more tuning parameters, a set of configuration parameters, a set of recipe parameters, etc.) for each product type of the plurality of product types. In an aspect, the nested data structure can be stored in data storage 116. In an implementation, the server 104 can include data storage 116. In another implementation, data storage 116 can be a memory of the controller component 108. In yet another implementation, data storage 116 can be coupled to the server 104 and/or the network 106. The nested data structure can be associated with a data tag (e.g., a data tag format) and/or a data tag file.

The data interface component 110 can be configured to manage a data table (e.g., tabular data) of a spreadsheet application that displays data corresponding to the configuration data stored in the nested data structure (e.g., the nested data structure associated with the controller component 108). For example, the data interface component 110 can manage data corresponding to the configuration data stored in the nested data structure for a data table associated with a spreadsheet application. The data interface component 110 can additionally be configured to provide a data table associated with a spreadsheet application access to a nested data structure associated with the controller component 108 (e.g., via a set of access permissions). For example, the data interface component 110 can provide a spreadsheet application read/write access to a nested data structure associated with the controller component 108. In certain embodiments, the data interface component 110 can provide a set of access permissions associated with a nested data structure to a spreadsheet application in response to a read command or a write command associated with the spreadsheet application. The data table (e.g., the tabular data) of the spreadsheet application can be a configured as a two-dimensional representation of the configuration data stored in the nested data structure. The data interface component 110 can rearrange, categorize and/or group the configuration data associated with the nested data structure into a two-dimensional tabular view via the data table of the spreadsheet application. In an aspect, the data interface component 110 can be instructed by the spreadsheet application to transfer data (e.g., stored data values) from the nested data structure to the data table of the spreadsheet application. The data interface component 110 can employ mapping information that maps individual elements of the nested data structure and the data table of the spreadsheet application. In one example, the spreadsheet application can initiate the transfer of data from the nested data structure to the data table of the spreadsheet application (e.g., when a "Read Values" button of the spreadsheet application is pushed). Data included in the data table of the spreadsheet application can facilitate improved visualization and/or management of the configuration data stored in the nested data structure.

In one example, the data interface component 110 can be associated with a process control driver and/or can access a nested data structure associated with the controller component 108 via a process control protocol. In another example, the data interface component 110 can be associated with a web services-based architecture. The spreadsheet application managed by the data interface component 110 can be an interface to the nested data structure. Accordingly, the configuration data is not stored by the spreadsheet application (e.g., in a datable of the spreadsheet application). Rather, the spreadsheet application can provide a summary (e.g., a "snapshot") of the configuration data stored in the nested data structure to facilitate improved visualization and/or management of the configuration data stored in the nested data structure. In an aspect, the data interface component 110 can generate, receive and/or employ a data file (e.g., a tag file) associated with a nested data structure (e.g., in response the read command associated with a spreadsheet application). The data interface component 110 can determine data corresponding to data (e.g., industrial data, configuration data, process data, recipe data, etc.) stored in the nested data structure for a data table associated with a spreadsheet application based on the data file. The data file can include mapping information that maps a nested data structure (e.g., a nested data structure associated with the controller component 108) to a data table associated with a spreadsheet application. The nested data structure can be formatted differently than the data table associated with the spreadsheet application. For example, the nested data structure can be configured in a first format and the data table associated with the spreadsheet application can be configured in a second format. The data interface component 110 can fill (e.g., populate) the data table associated with the spreadsheet application with configuration data based on the mapping information stored in the data file. Accordingly, the controller component 108 can store data (e.g., industrial data, configuration data, process data, recipe data, etc.) in a nested data structure, a data file (e.g., a tag file) can store information regarding where data values are stored in the nested data structure, the data interface component 110 can determine and/or receive the data stored in the nested data structure via the data file, and a data table of a spreadsheet application can receive data and/or display data corresponding to the data values stored in the nested data structure.

Figure 2:
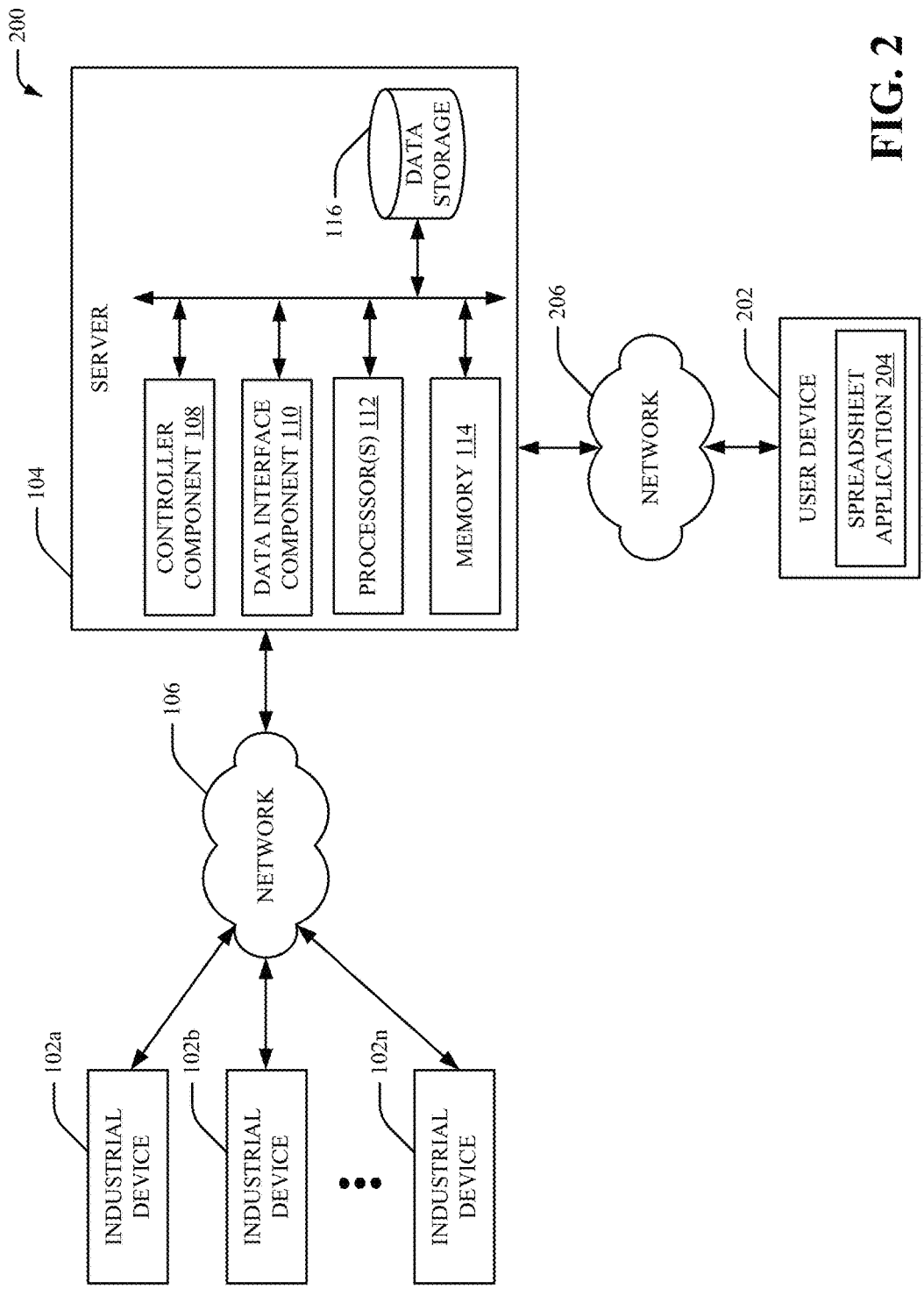
FIG. 2 is an overview of another system that facilitates configuration management of industrial data.

FIG. 2 illustrates an example system 200 for storing, managing and/or displaying data associated with at least one manufacturing process (e.g., at least one industrial process). System 200 includes the one or more industrial devices 102*a*-*n*, the server 104 and at least one user device 202. The user device 202 can include a spreadsheet application 204. The user device 202 can be configured to display a data table (e.g., tabular data) associated with the spreadsheet application 204.

The industrial devices 102*a*-*n* can communicate (e.g., exchange data) with the server 104 via the network 106. The user device 202 (e.g., the spreadsheet application 204) can communicate (e.g., exchange data) with the server 104 via a network 206. Alternatively, the user device 202 (e.g., the spreadsheet application 204) can communicate (e.g., exchange data) directly with the server 104 (e.g., without the network 206). In one example, the network 206 can be different than the network 106. In another example, the network 206 can be associated with the network 106 (e.g., the network 206 can be the same network as the network 106). The network 206 can be a local network and/or can be associated with an Ethernet communication protocol. The network 206 can comprise a physical network (e.g., a physical local area network, hardwired I/O, etc.) and/or a wireless network (e.g., a wireless local area network, etc.). The network 206 can be implemented as, for example, a plant facility network (e.g., a process network of one or more plant facilities) such as, but not limited to, Ethernet/IP, Data Highway Plus, ControlNet, DeviceNet, or the like. The network 206 can comprise one or more network-related devices (e.g., communication devices, routers (e.g., wireline routers and/or wireless routers), switches, etc.), where respective network-related devices can be connected to or interfaced with certain other network-related devices to form a communication network having a desired communication network configuration. Accordingly, components (the server 104, the user device 202, etc.) can communicate via a wireline or wireless connection using virtually any desired type of wireline or wireless communication technology (e.g., broadband, Wi-Fi, WiMax, cellular, digital subscriber line (DSL)-type communication technology, T-1, T-3, optical carrier communication technology (e.g., synchronous optical networking (SONET)), etc.).

The spreadsheet application 204 can access data (e.g., configuration data, industrial data, process data, recipe data, etc.) associated with the industrial devices 102*a*-*n* (e.g., the nested data structure associated with the controller component 108) via the data interface component 110. For example, the spreadsheet application 204 can be configured as a data table (e.g., tabular data) that includes data corresponding to configuration data stored in the nested data structure. The data interface component 110 can manage data corresponding to configuration data stored in the nested data structure for the data table (e.g., the tabular data) associated with the spreadsheet application 204. Configuration data stored in the nested data structure can be reformatted via the data table. Data included in the data table of the spreadsheet application 204 can be arranged as a function of a plurality of product types associated with the configuration data and/or parameters associated with the configuration data. The data table of the spreadsheet application 204 can be refreshed to include data corresponding to the configuration data stored in the nested data structure. Therefore, the data table of the spreadsheet application 204 can provide a current status of the industrial devices 102*a*-*n*. In an aspect, the spreadsheet application 204 and/or the data interface component 110 can generate a data file to facilitate populating a data table of the spreadsheet application 204 with data corresponding to the configuration data stored in the nested data structure. The data file can be a mapping tool to map the nested data structure to a data table of the spreadsheet application 204. For example, the data file can include mapping information that maps the nested data structure to a data table of the spreadsheet application 204.

The data table of the spreadsheet application 204 can additionally be configured to modify and/or update the configuration data stored in the nested data structure. The data interface component 110 can provide the spreadsheet application 204 access to the nested data structure. For example, the data interface component 110 can provide a set of access permissions to the spreadsheet application 204 (e.g., in response to a read command or a write command associated with the spreadsheet application 204). Accordingly, the spreadsheet application 204 can be an interface to the nested data structure associated with the controller component 108 (e.g., an interface to configuration data associated with the industrial devices 102*a*-*n*). Since the spreadsheet application 204 is an interface to the nested data structure and configuration data is not stored by the spreadsheet application 204, other data not associated with the nested data structure can be accessed separately from the configuration data associated with the nested data structure (e.g., other data not associated with the nested data structure can be protected).

In an aspect, the user device 202 can be a user workstation device (e.g., a remote user device). In addition to data associated with the spreadsheet application 204, the user device 202 can access other data associated with the industrial devices 102*a*-*n* (e.g., other data associated with a process and/or a recipe, other data associated with industrial devices 102*a*-*n* and/or other industrial devices, other data in an industrial system and/or an automated system, etc.). The user device 202 can be associated with processor(s) that may interact with a keyboard, a mouse, a display monitor, a touchscreen, and/or other such interface devices. The user device 202 can include, but is not limited to, a desktop computer, a laptop computer, a tablet computer, a smartphone, or another type of user device. It is to be appreciated that the user device 202 can be configured to receive user input and/or to render output (e.g., a data table associated with the spreadsheet application 204) to a user in any suitable format (e.g., visual, audio, tactile, etc.). The user device 202 can communicate with the server 104 (e.g., the data interface component 110) based on communication information associated with the server 104 and/or the data interface component 110. For example, the user device 202 can communicate with the server 104 and/or the data interface component 110 based on a host name associated with the server 104 and/or a TCP/IP port number associated with the data interface component 110. The data interface component 110 can respond to a set of instructions provided by the user device 202 (e.g., the spreadsheet application 204). In one example, the set of instructions can be formatted as a dynamic-link library (DLL) and/or can be initiated by the spreadsheet application 204. In an aspect, the data interface component 110 can select a data table template (e.g., a spreadsheet template) for a data table from a set of data table templates (e.g., a set of spreadsheet templates) for the spreadsheet application 204 based on the configuration data (e.g., type of configuration data, classification of the configuration data, etc.) associated with the nested data structure (e.g., an application associated with the industrial devices 102a-n). It is to be appreciated that the system 200 can include more than one user device 202 (e.g., more than one user workstation device).

FIG. 3 illustrates an example data table 300 of a spreadsheet application (e.g., the spreadsheet application 204). The data table 300 can be a spreadsheet data table that includes data 306 corresponding to configuration data stored in a nested data structure (e.g., a nested data structure associated with the controller component 108). Configuration data stored in a nested data structure (e.g., a nested data structure associated with the controller component 108) can be reformatted via the data table 300. The data table 300 (e.g., a spreadsheet data table) can comprise data field(s) associated with a plurality of product types 302 (e.g., a plurality of product grades 302) associated with the configuration data (e.g., the data 306 corresponding to configuration data stored in a nested data structure). The data field(s) associated with the plurality product types 302 can be arranged in columns of the data table 300. Additionally, the data table 300 can comprise data field(s) associated with configuration parameters 304 (e.g., recipe parameters, a set of variables, a set of tuning parameters, etc.) associated with the configuration data (e.g., the data 306 corresponding to configuration data stored in a nested data structure). The data field(s) associated with configuration parameters 304 can be arranged in rows.

The data 306 corresponding to configuration data (e.g., configuration data associated with industrial devices 102a-n) can be associated with corresponding data field(s) for the plurality product types 302 and the configuration parameters 304. For example, the data table 300 can be configured to display the data 306 corresponding to configuration data associated with a nested data structure (e.g., a nested data structure associated with the controller component 108 and/or the industrial devices 102a-n) as a function of the plurality of product types 302 and/or the configuration parameters 304. The data interface component 110 can map each data field of the data table 300 to a location associated with a nested data structure associated with the controller component 108 (e.g., a nested data structure that stores the configuration data associated with the data 306). Accordingly, the data table 300 can facilitate a two-dimensional view of data associated with a nested data structure configured with nested groups of data (e.g., hierarchical levels of data).

The data table 300 can also include, for example, two buttons to refresh the data 306 included in the data table 300 (e.g., the data 306 corresponding to configuration data stored in a nested data structure) and/or to modify the configuration data stored in the nested data structure. For example, the data table 300 can comprise a first button 308 (e.g., a "Read Values" button 308) to update the data table 300 with current values for configuration data stored in a nested data structure and/or a second button 310 (e.g., a "Write Values" button 310) to update configuration data stored in a nested data structure (e.g., to change parameter limits and/or parameter targets associated with configuration data). The first button 308 and the second button 310 can be associated with a spreadsheet programming language to perform corresponding actions. In an example, a user (e.g., an operator, an engineer, a production engineer, a process engineer, a supervisor, etc.) can press the first button 308 (e.g., the "Read Values" button 308) to update the data table 300 with current configuration data (e.g., current configuration data included in a nested data structure associated with the controller component 108). The user can additionally select cells corresponding to desired product types (e.g., desired product grades) and/or configuration parameters to adjust values of configuration data (e.g., configuration data included in a nested data structure associated with the controller component 108). Moreover, the user can press the second button 310 (e.g., the "Write Values" button 310) to send updated configuration data to a nested data structure associated with the controller component 108. In an aspect, a data table template (e.g., a spreadsheet template) associated with the data table 300 can be selected from a set of data table templates (e.g., a set of spreadsheet templates). A data table template (e.g., a spreadsheet template) associated with the data table 300 can be selected based on configuration data associated with a nested data structure (e.g., an industrial application associated with the industrial devices 102a-n, etc.).

The data table 300 of a spreadsheet application (e.g., the spreadsheet application 204) can provide an intuitive tool for viewing, editing and/or managing data of a nested data structure associated with the controller component 108 (e.g., a nested data structure that includes data associated with industrial device 102a-n). A user can employ the data table 300, and therefore view, edit and/or manage data of a nested data structure associated with the controller component 108, with virtually no training. The data table 300 of a spreadsheet application (e.g., the spreadsheet application 204) can also provide a current status of the industrial devices 102a-n. Moreover, due to the tabular configuration of the data table 300, configurations for each product type and/or product grade associated with configuration data of a nested data structure are easy to navigate, analyze and/or modify.

In an embodiment, the data interface component 110 and/or the spreadsheet application 204 can be configured to generate alerts, notifications and/or flags based on data (e.g., data 306) included in the data table 300. For example, the data interface component 110 and/or the spreadsheet application 204 can generate an alert, a notification and/or a flag in response to a determination that data included in the data table 300 is outside of a tolerance range or outside certain defined bounds. The data interface component 110 and/or the spreadsheet application 204 can additionally or alternatively be configured to employ conditional formatting of the data table 300 based on data (e.g., data 306) included in the data table 300. The spreadsheet application 204 can, for example, modify a visual appearance of particular data included in the data table 300 in response to a determination that the particular data is outside of a tolerance range or outside certain defined bounds.

In another embodiment, the data interface component 110 and/or the spreadsheet application 204 can utilize artificial intelligence techniques to facilitate obtaining, managing and/or modifying data associated with the data table 300 (e.g., data corresponding to configuration data stored in a nested data structure). The data interface component 110 and/or the spreadsheet application 204 can utilize at least one artificial intelligence technique to make at least one inference or at least one determination in regard to collection, management and/or modification of data associated with the data table 300. For example, the data interface component 110 and/or the spreadsheet application 204 can employ one of numerous methodologies for learning from data, drawing inferences from data and/or making determinations associated with data (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.). The data interface component 110 and/or the spreadsheet application 204 can additionally or alternatively employ methodologies for the capture of logical relationships of data, such as but not limited to, theorem provers, heuristic rule-based expert systems, etc. Artificial intelligence techniques can also be employed by the data interface component 110 and/or the spreadsheet application 204 to determine specific process constraints (e.g., process variable constraints, temperature constraints, pressure constraints, etc.), specific process targets and/or other data for producing an optimal product (e.g., a golden batch) using industrial device 102a-n.

FIG. 4 illustrates an example nested data structure 400 associated with a data table of a spreadsheet application (e.g., associated with data table 300). The nested data structure 400 can be configured as a hierarchy of configuration data associated with industrial device 102a-n and/or can comprise a plurality of product types (e.g., a plurality of product grades) for a product associated with industrial devices 102a-n. Each data field associated with configuration data of a data table for a spreadsheet application (e.g., the data table 300) can be mapped to a location (e.g., an exact location) in the nested data structure 400. For example, cells of the data table 300 (e.g., data 306) can be mapped to the nested data structure 400. In response to a command (e.g., a read command) initiated by a spreadsheet application (e.g., the spreadsheet application 204), a data file configured to map data associated with the nested data structure 400 to a data table for a spreadsheet application (e.g., the data table 300) can be generated. For example, the data interface component 110 and/or the spreadsheet application 204 (e.g., the data interface component 110 in connection with the spreadsheet application 204) can generate, receive and/or employ a data file (e.g., a tag file) configured to map data associated with the nested data structure 400 to the data table 300 in response to the first button 308 (e.g., the "Read Values" button) being pushed. The data file can be stored in a data storage associated with the user device 202 or a data storage associated with the server 104. Mapping information included in the data file (e.g., a mapping of the nested data structure 400 to a data table for a spreadsheet application) can be managed by the data interface component 110. For example, the data interface component 110 can map data (e.g., data values) of the nested data structure 400 to a data table for a spreadsheet application (e.g., the data table 300) via the data file. Mapping information stored in the data file can include, for example, a mapping of cells of the data table 300 (e.g., data 306) to elements of the nested data structure 400. The data interface component 110 and/or the spreadsheet application 204 can further add data values of the nested data structure 400 to a data table (e.g., data table 300) of the spreadsheet application 204 via the mapping of the data file. For example, the data interface component 110 can fill the data table 300 with the configuration data stored in the nested data structure 400 via the mapping included in the data file.

In response to another command (e.g., a write command) initiated by a spreadsheet application (e.g., the spreadsheet application 204), the nested data structure 400 can be updated based on the data file that maps the nested data structure 400 to a spreadsheet application (e.g., the data table 300). For example, in response to the second button 310 (e.g., the "Write Values" button) being pushed, the data interface component 110 can transfer values included in the spreadsheet application (e.g., the data table 300) to the nested data structure 400 via the data file. In one example, all values of the spreadsheet application (e.g., the data table 300) can be transferred to the nested data structure 400 (e.g., values of the nested data structure 400 can be replaced by values of the spreadsheet application). In another example, values of the spreadsheet application (e.g., the data table 300) that are transferred to the nested data structure 400 can include only new values of the spreadsheet application (e.g., the data table 300) that are not included in the nested data structure 400. Accordingly, the data interface component 110 can update configuration data stored in the nested data structure 400 (e.g., in response to a write command generated by a spreadsheet application associated with the data table 300) as a function of adjusted configuration data associated with the data table 300.

In an aspect, the nested data structure 400 can be configured as a data tag associated with the controller component 108 (e.g., a controller-scope array-type nested tag) to store configuration data associated with industrial devices 102a-n. A tag (e.g., Lgx_CM_Grade shown in FIG. 4) can be configured as an n-element array for different product types (e.g., different product grades) of a product generated based on at least one manufacturing process (e.g., at least one manufacturing process associated with the industrial devices 102a-n). Structure of the nested data structure 400 can be set by a user-defined data type (e.g., CM_Grade shown in FIG. 4) associated with configuration data for a product generated based on at least one manufacturing process. A user-defined data type (e.g., CM_Grade shown in FIG. 4) associated with configuration data can encompass a set of variables (e.g., Prod_Rate, Sugar_Flow, Fryer_A2_Temp, etc. shown in FIG. 4) and/or a set of tuning parameters (e.g., Prod_Rate.MAX, Prod_Rate.MIN, Prod_Rate.Max_Incr, Prod_Rate.Max_Decr, etc. shown in FIG. 4) for a plurality of product types (e.g., a plurality of product grades). Tuning parameters can include process constraints associated with recipe parameters (e.g., Prod_Rate.MAX, Prod_Rate.MIN, etc. shown in FIG. 4) and/or configuration parameters (e.g., Prod_Rate.MS, Prod_Rate.Max_Incr, Prod_Rate.Max_Decr, etc. shown in FIG. 4). Configuration data 402 shown in FIG. 4 can be associated with a set of variables and a set of tuning parameters for a first product type (e.g., CM_Grade[0]). Configuration data 402 can be a nested group of configuration data associated with the first product type (e.g., CM_Grade[0]). Furthermore, configuration data 402 can include a plurality of levels of configuration data (e.g., a plurality of branches of configuration data) and/or configuration data 402 can be associated with a hierarchical level of the nested data structure 400.

The data interface component 110 can utilize data security techniques and/or data authentication techniques (e.g., authentication and/or data cryptography techniques) to facilitate securing data associated with a nested data structure 400 so that only authorized users are able to access data associated with the nested data structure 400. For example, the data interface component 110 can authenticate and/or verify users attempting to access the nested data structure 400 via a data table 300 of a spreadsheet application (e.g., spreadsheet application 204). The data interface component 110 can register different users, and can assign respective (e.g., different) users respective unique user identification (ID) numbers and/or respective unique authentication credentials. The data interface component 110 can receive authentication credentials (e.g., username, password, personal identification number (PIN), radio frequency identification (RFID) information, smart card information, and/or biometric authentication credentials (e.g., fingerprint information, information relating to facial recognition, information relating to an eye scan, etc.), etc.) from a user associated with data table 300 of a spreadsheet application (e.g., spreadsheet application 204), for example, via the user device 202. For instance, the authentication credentials can be provided to the user device 202 by a user using a touch screen interface, keyboard or keypad, mouse, biometric interface, magnetic stripe reader, RFID reader, bar code reader (e.g., scanner), smart card reader, or other desired interface of the user device 202. In an embodiment, a user can have an ID card (e.g., employee ID card, RFID tag, and/or smart card, etc.) and/or a device (e.g., a user device, a smartphone, etc.) that can comprise authentication credentials of the user, or a portion thereof (e.g., stored on the ID card and/or the device).

Figure 5:
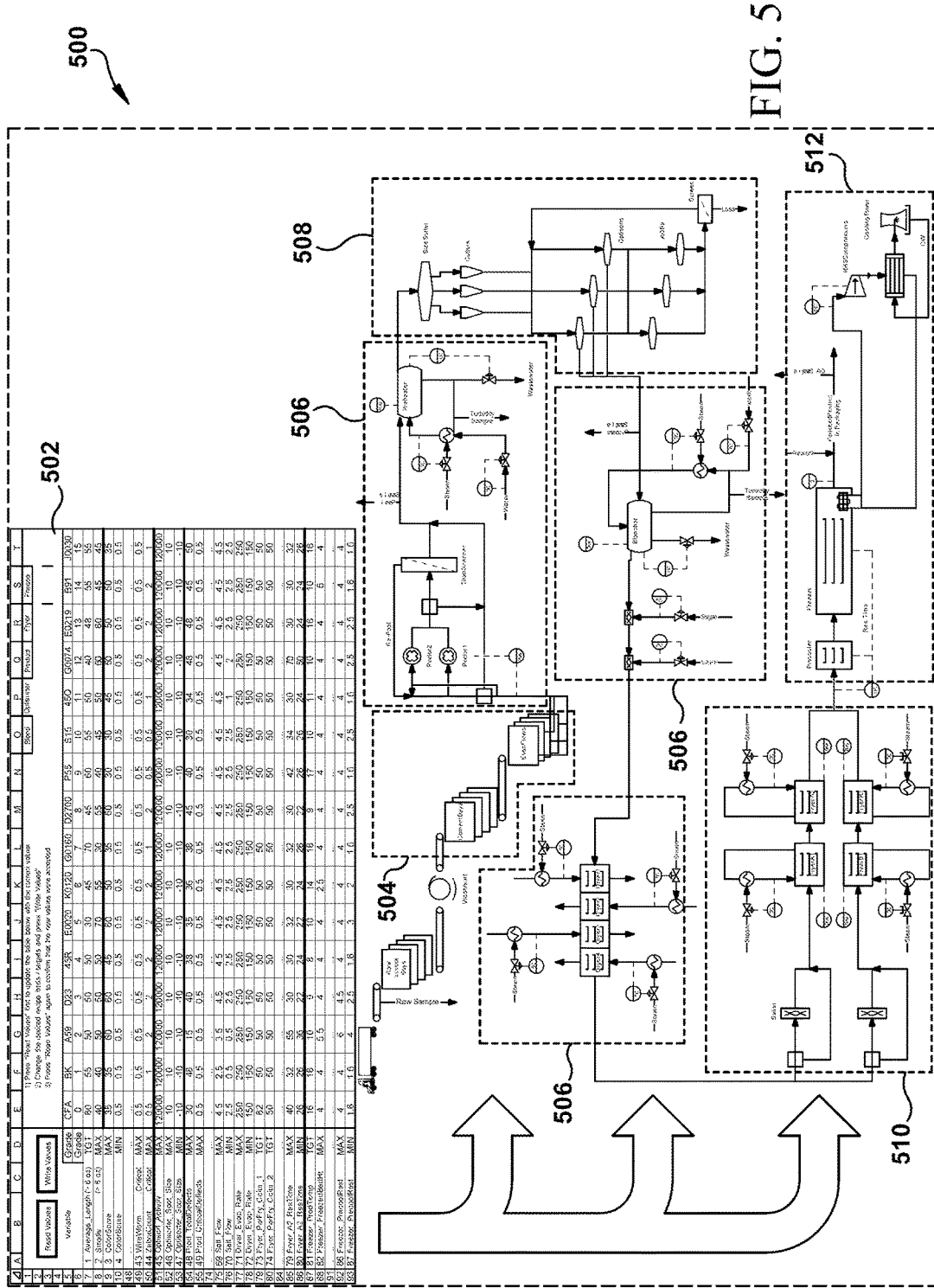
FIG. 5 is a high-level overview of an exemplary process line associated with tabular data of a spreadsheet application.

FIG. 5 illustrates a system 500 associated with a plurality of industrial processes (e.g., a plurality of manufacturing processes) in an industrial facility (e.g., a plant facility). As shown in FIG. 5, configuration data (e.g., industrial data, recipe data, etc.) is supplied to different parts of an industrial facility (e.g., a plant facility). The system 500 includes a data table 502 of a spreadsheet application, an industrial process 504, an industrial process 506, an industrial process 508, an industrial process 510 and an industrial process 512. The industrial process 504, the industrial process 506, the industrial process 508, the industrial process 510 and the industrial process 512 can be associated with an industrial processing line (e.g., a manufacturing line). In a non-limiting example, the industrial process 504 can be associated with a blending process, the industrial process 506 can be associated with a sorting process, the industrial process 508 can be associated with a product process, the industrial process 510 can be associated with a fryer process and the industrial process 512 can be associated with a freezer process in a food processing plant. The industrial process 504, the industrial process 506, the industrial process 508, the industrial process 510 and the industrial process 512 can each be associated with one or more industrial devices.

The data table 502 can be generated based on configuration data (e.g., industrial data, recipe data, process data, etc.) associated with the industrial process 504, the industrial process 506, the industrial process 508, the industrial process 510 and the industrial process 512. Initially, configuration data associated with the industrial process 504, the industrial process 506, the industrial process 508, the industrial process 510 and the industrial process 512 can be stored in a nested data structure (e.g., a hierarchical data structure) associated with the controller component 108. The configuration data stored in the nested data structure can be rearranged, categorized and/or grouped via the data table 502. The data table 502 can also be rendered on a display of a user device (e.g., user device 202) via a spreadsheet application (e.g., spreadsheet application 204). In an embodiment, configuration data stored in the nested data structure can be rearranged, categorized and/or grouped based on the industrial process 504, the industrial process 506, the industrial process 508, the industrial process 510 and the industrial process 512. For example, configuration data associated with a particular industrial process (e.g., industrial process 504, industrial process 506, industrial process 508, industrial process 510 or industrial process 512) can be grouped together in the data table 502.

Additionally or alternatively, configuration data included in the data table 502 can be visually formatted (e.g., color-coded, etc.) based on a corresponding industrial process. For example, configuration data of the data table 502 that corresponds to the industrial process 504 can be formatted with a first visual characteristic (e.g., associated with a first color), configuration data of the data table 502 that corresponds to the industrial process 506 can be formatted with a second visual characteristic (e.g., associated with a second color), etc. Visual data for industrial processes (e.g., industrial process 504, industrial process 506, industrial process 508, industrial process 510, industrial process 512, etc.) that is rendered on a display of a user device 202 can also be visually formatted (e.g., color-coded, etc.) with corresponding configuration data of the data table 502.

FIGS. 6-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 6:
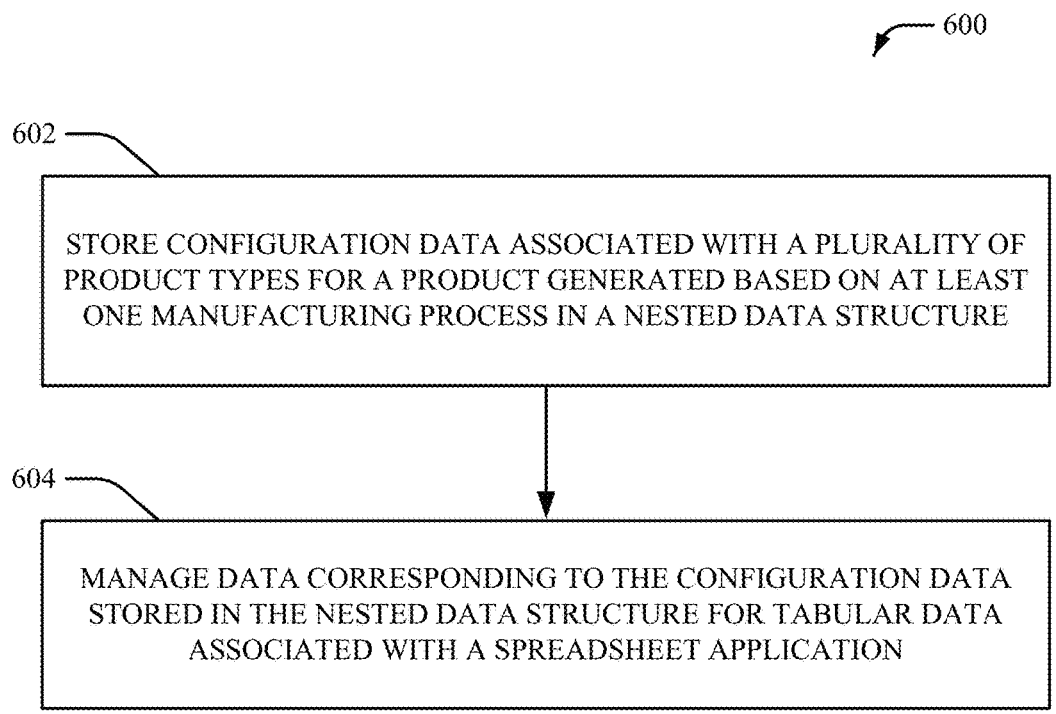
FIG. 6 is a flowchart of an example methodology to facilitate displaying configuration data associated with at least one manufacturing process.

FIG. 6 illustrates an example methodology 600 to facilitate displaying configuration data associated with at least one manufacturing process. Initially, at 602, configuration data associated with a plurality of product types for a product generated based on at least one manufacturing process is stored (e.g., using a controller component 108) in a nested data structure. Configuration data can be associated with a recipe for at least one manufacturing process employed to produce a product. Additionally or alternatively, configuration data can be associated with one or more industrial devices (e.g., industrial devices 102*a-n*). Configuration data can include, for example, a set of variables, a set of tuning parameters, a set of configuration parameters, a set of recipe parameters, specific process constraints (e.g., process variable constraints), specific process targets and/or other process data that facilitate production of the product. Each of the plurality of product types can be associated with a unique set of configuration data. The nested data structure can be a hierarchical data structure. Furthermore, the nested data structure can be formatted based on the plurality of product types for the product. For example, each product type of the plurality of product types can be associated with a branch (e.g., a hierarchical level, a nested group, etc.) of the nested data structure.

At 604, data corresponding to the configuration data stored in the nested data structure can be managed (e.g., using a data interface component 110) for tabular data associated with a spreadsheet application. For example, configuration data stored in the nested data structure can be reformatted (e.g., rearranged, categorized and/or grouped) via the tabular data. Data of the tabular data that corresponds to the configuration data stored in the nested data structure can also be modified and/or configuration data stored in the nested data structure can be updated based on the data of the tabular data. The tabular data can be rendered (e.g., displayed) on a display of a user device via the spreadsheet application.

Figure 7:
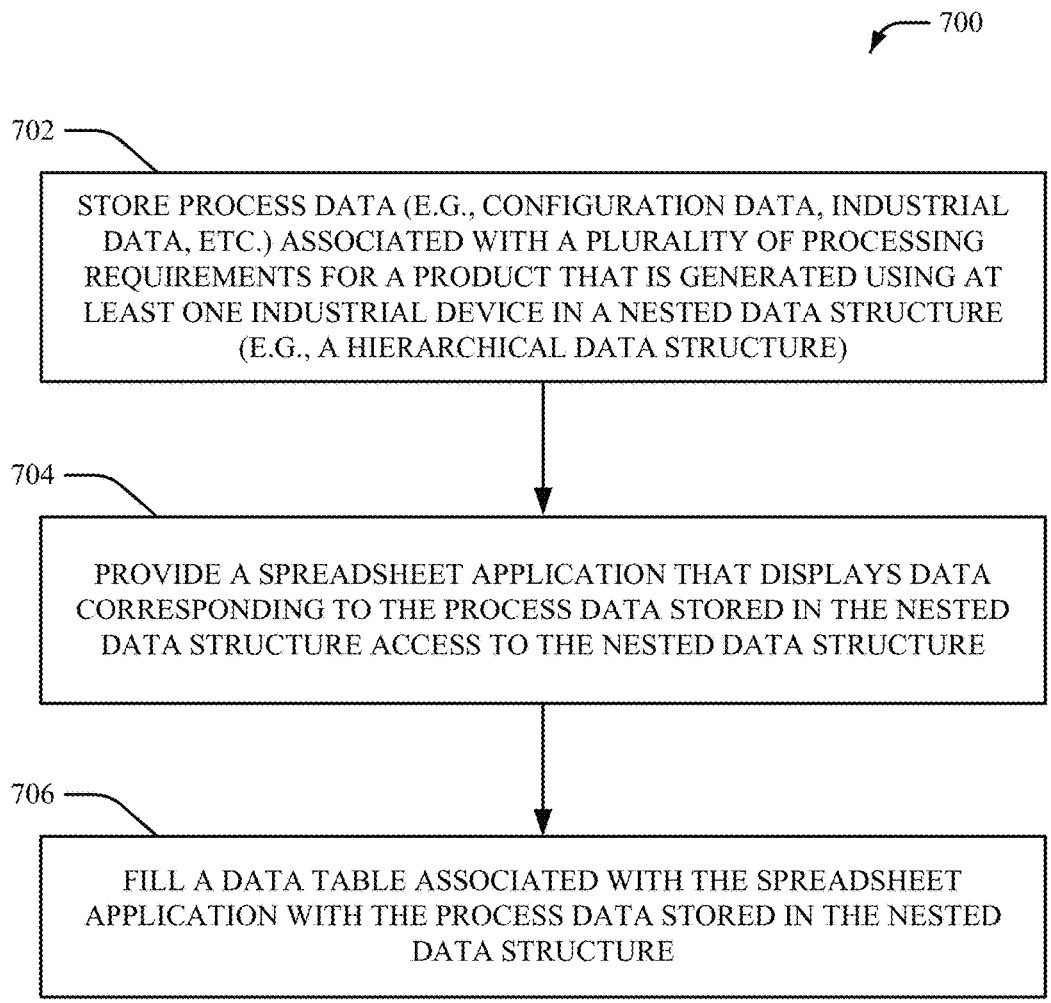
FIG. 7 is a flowchart of an example methodology to facilitate displaying process data associated with at least one industrial device.

FIG. 7 illustrates an example methodology 700 to facilitate displaying process data associated with at least one industrial device. Initially, at 702, process data (e.g., configuration data, industrial data, etc.) associated with a plurality of processing requirements for a product that is generated using at least one industrial device is stored (e.g., using a controller component 108) in a nested data structure (e.g., a hierarchical data structure). Each of the plurality of processing requirements can be associated with a unique product type for the product.

At 704, a spreadsheet application that displays data corresponding to the process data stored in the nested data structure is provided access (e.g., using a data interface component 110) to the nested data structure. For example, the spreadsheet application can be provided a set of access permission (e.g., read/write access) for the nested data structure (e.g., the hierarchical data structure). The spreadsheet application can access the nested data structure via a data file associated with the spreadsheet application. The data file can include mapping information to map the process data stored in the nested data structure to the spreadsheet application (e.g., a data table associated with the spreadsheet application). The spreadsheet application can access to the nested data structure via a server (e.g., a data interface component 110 implemented on a server 104).

At 706, a data table associated with the spreadsheet application is filled (e.g., using a data interface component 110) with the process data stored in the nested data structure. For example, the data file that includes a mapping of the process data stored in the nested data structure to the data table of the spreadsheet application can be employed to populate the data table with the process data.

Figure 8:
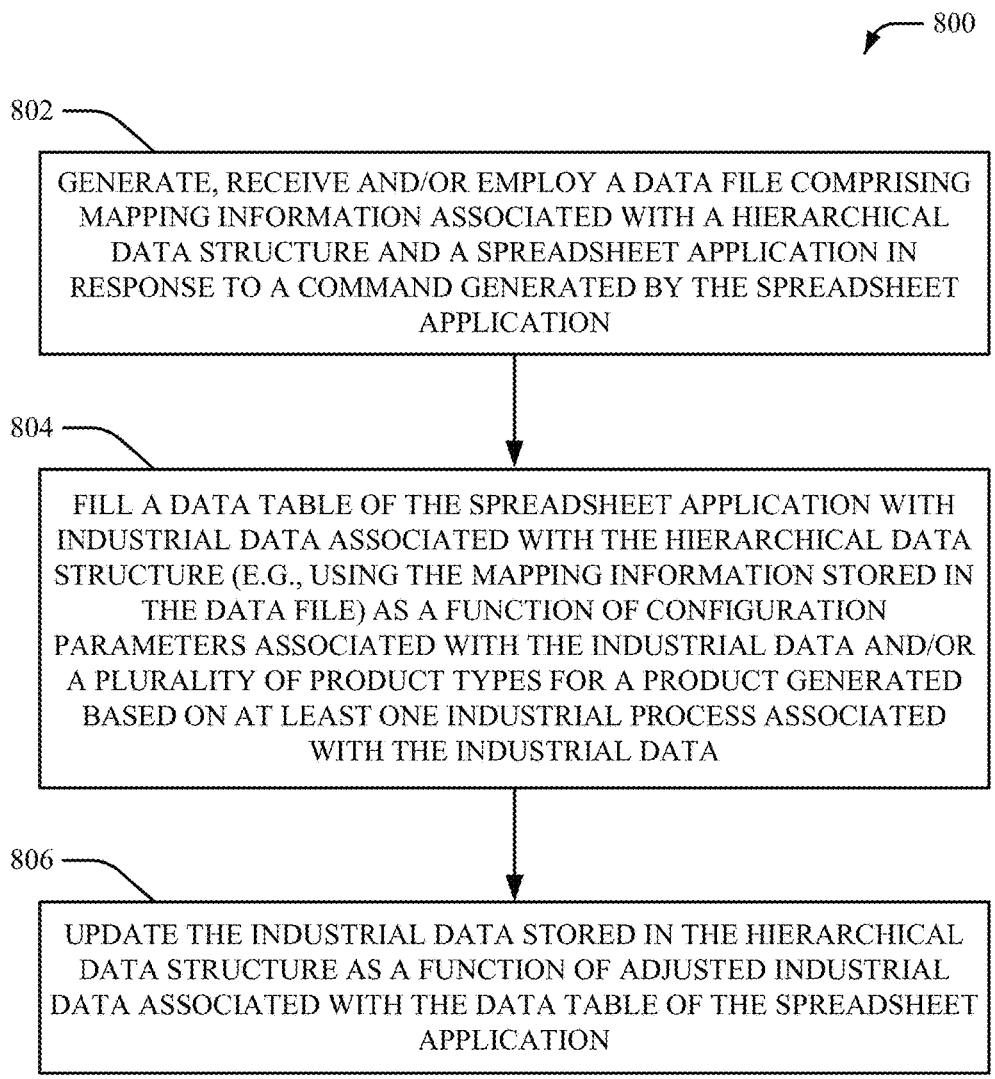
FIG. 8 is a flowchart of an example methodology for managing industrial data.

FIG. 8 illustrates an example methodology 800 for managing industrial data. Initially, at 802, a data file comprising mapping information associated with a hierarchical data structure and a spreadsheet application is generated, received and/or employed (e.g., using a data interface component 110) in response to a command generated by the spreadsheet application. For example, mapping information that maps industrial data included in the hierarchical data structure to the spreadsheet application can be stored in a data file. As such, the mapping information (e.g., the data file) can be generated, received and/or employed in response to a command (e.g., a command to read data values stored in a hierarchical data structure) generated by the spreadsheet application.

At 804, a data table of the spreadsheet application is filled with industrial data associated with the hierarchical data structure (e.g., using the mapping information stored in the data file) as a function of configuration parameters associated with the industrial data and/or a plurality of product types for a product generated based on at least one industrial process associated with the industrial data (e.g., using a data interface component 110). For example, the industrial data associated with the hierarchical data structure can be added to a data table of the spreadsheet application via the mapping information stored in the data file. The data table can be configured (e.g., formatted) as a function of configuration parameters associated with the industrial data and/or a plurality of product types associated with the industrial data.

At 806, the industrial data stored in the hierarchical data structure is updated (e.g., using a data interface component 110) as a function of adjusted industrial data associated with the data table of the spreadsheet application. For example, the mapping information stored in the data file can be employed to update the hierarchical data structure based on updated industrial data associated with the data table of the spreadsheet application.

Figure 9:
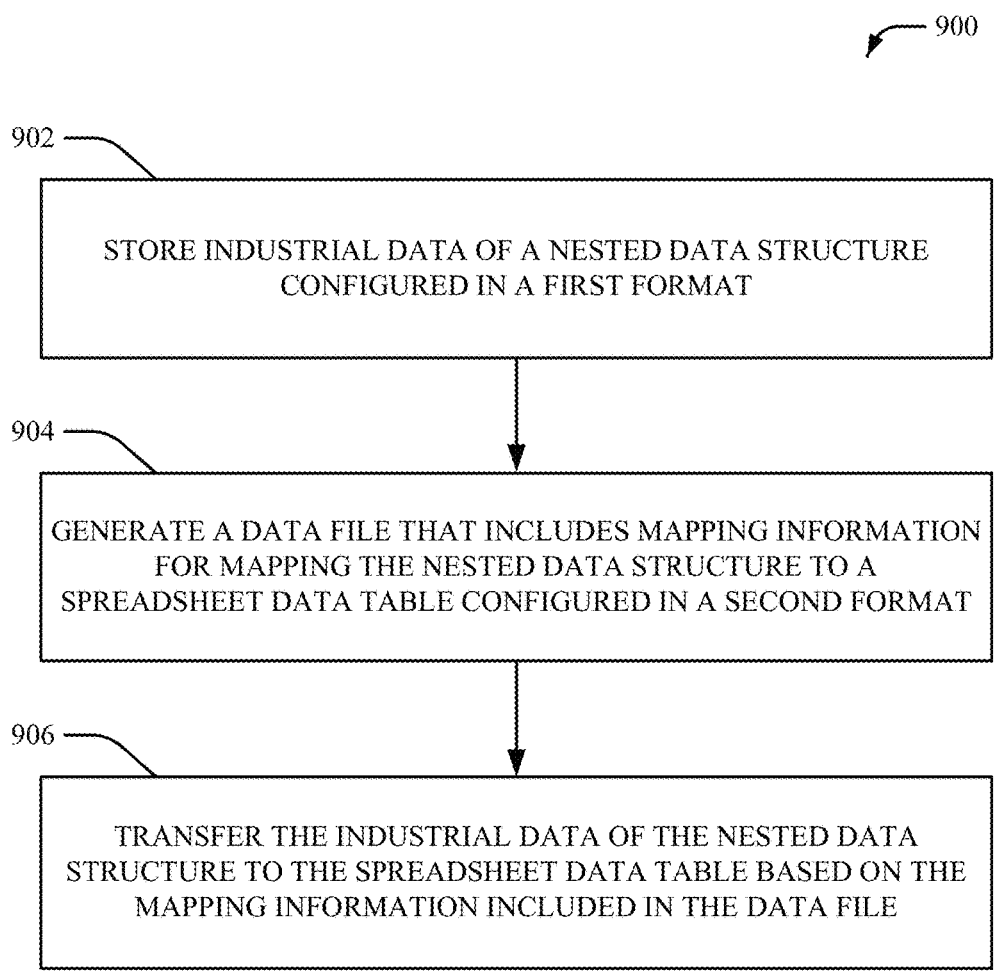
FIG. 9 is a flowchart of an example methodology for employing a data file to manage industrial data.

FIG. 9 illustrates an example methodology 900 for employing a data file to manage industrial data. Initially, at 902, industrial data of a nested data structure configured in a first format is stored (e.g., by a controller component 108). The nested data structure can be configured, for example, in a format associated with a hierarchical data structure (e.g., a data structure with nested groups of data, a linked data structure, a data structure associated with nodes, branches and/or levels, etc.). For example, the nested data structure can be configured in a format associated with the controller component 108.

At 904, a data file that includes mapping information for mapping the nested data structure to a spreadsheet data table configured in a second format is generated (e.g., using a data interface component 110 and/or a spreadsheet application 204). For example, the data file can be a mapping between individual elements of the nested data structure and data table cells of a spreadsheet application.

At 906, the industrial data of the nested data structure is transferred to the spreadsheet data table (e.g., using a data interface component 110) based on the mapping information included in the data file. For example, tabular data of a spreadsheet application can be generated based on the industrial data of the nested data structure via the mapping information included in the data file.

Figure 10:
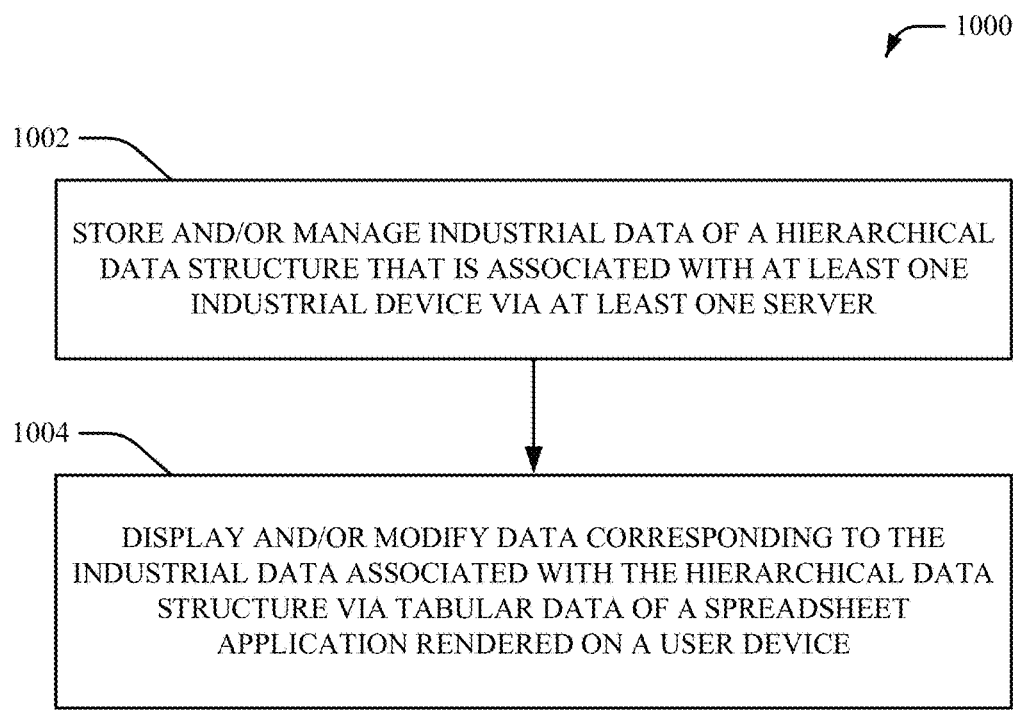
FIG. 10 is a flowchart of an example methodology for managing configuration of industrial data.

FIG. 10 illustrates an example methodology 1000 for managing configuration of industrial data. Initially, at 1002, industrial data of a hierarchical data structure that is associated with at least one industrial device is stored and/or managed via at least one server (e.g., a server 104). The hierarchical data structure can be associated with a controller (e.g., controller component 108) implemented on at least one server (e.g., a server 104). A configuration manager of the at least one server (e.g., data interface component 110) can manage the industrial data of the hierarchical data structure to facilitate displaying the industrial data of the hierarchical data structure via a spreadsheet application (e.g., tabular data of a spreadsheet application) associated with a user device. For example, a configuration manager of the at least one server (e.g., data interface component 110) can reformat the industrial data of the hierarchical data structure to facilitate displaying the industrial data of the hierarchical data structure via a spreadsheet application (e.g., tabular data of a spreadsheet application) associated with a user device.

At 1004, data corresponding to the industrial data associated with the hierarchical data structure is displayed and/or modified via tabular data of a spreadsheet application rendered on a user device (e.g., a user device 202). The data corresponding to the industrial data associated with the hierarchical data structure can correspond to a reformatted version of the industrial data associated with the hierarchical data structure. The spreadsheet application can be an interface to the hierarchical data structure. In one example, the user device can interface (e.g., remotely interface) to the hierarchical data structure via a network.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term controller (e.g., PLC or automation controller) as used herein can include functionality that can be shared across multiple components, systems, and/or networks. As an example, one or more controllers (e.g., one or more PLCs or automation controllers) can communicate and cooperate with various network devices across a network. This can include substantially any type of control, communications module, computer, Input/Output (I/O) device, sensor, actuator, and human machine interface (HMI) that communicate via the network, which includes control, automation, and/or public networks. The controller (e.g., PLC or automation controller) can also communicate to and control various other devices such as standard or safety-rated I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 11:
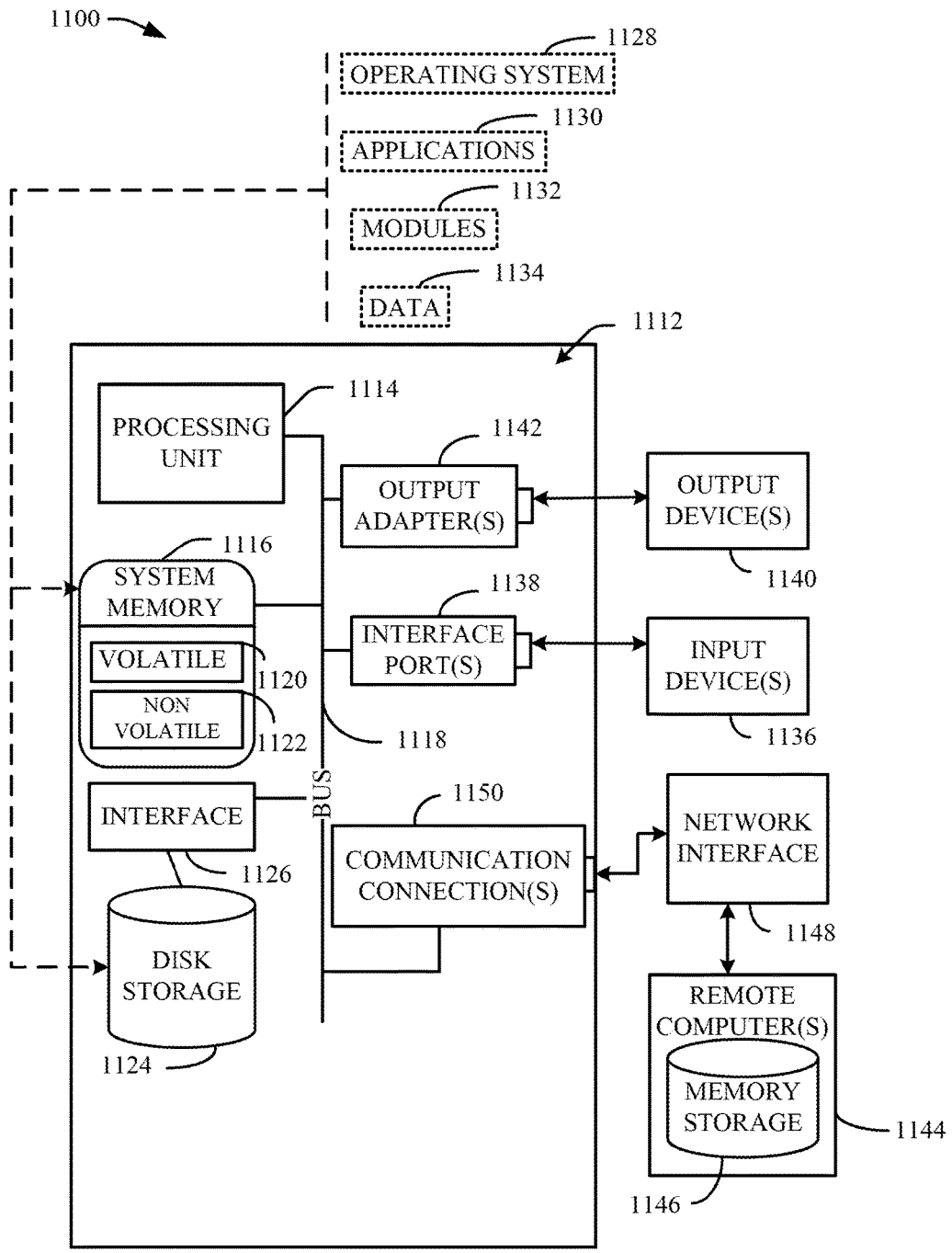
FIG. 11 is an example computing environment.
Figure 12:
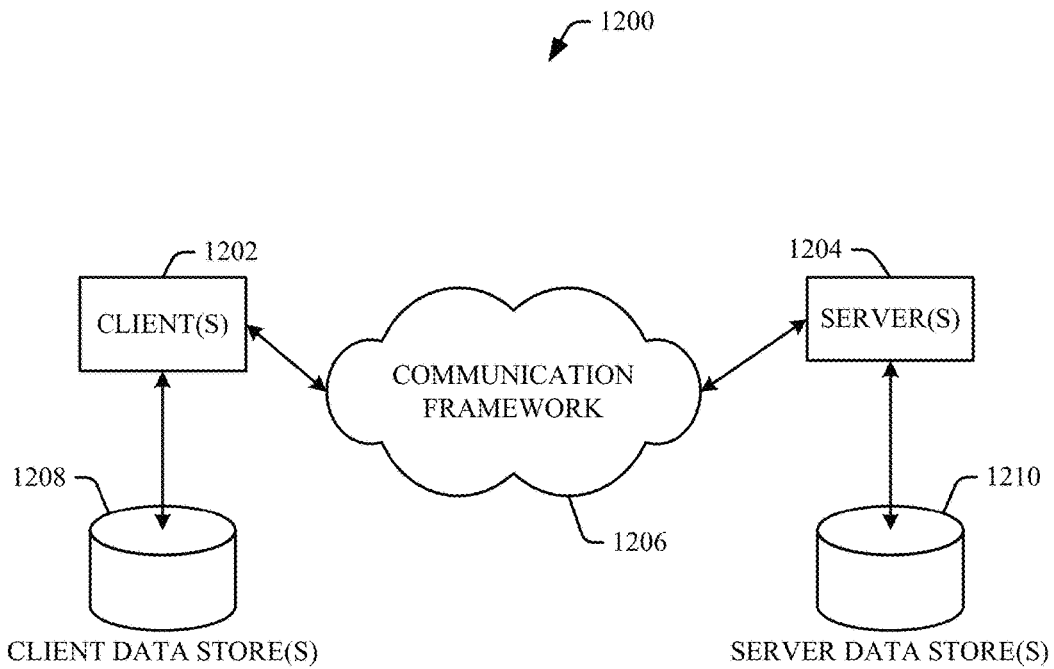
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores computer-executable components; and
   a processor, operatively coupled to the memory, that executes the computer-executable components, the computer-executable components comprising:
   a controller component configured to control one or more first automated manufacturing processes of a first industrial tool associated with a first product, to control one or more second automated manufacturing processes of a second industrial tool associated with a second product, and to store, in a nested data structure, configuration data associated with a plurality of product types for the first product generated based on the first automated manufacturing process and the second product generated based on the second automated manufacturing process; and a data interface component configured to manage industrial data associated with the configuration data stored in the nested data structure for a data table associated with a spreadsheet application, wherein the industrial data associated with the nested data structure is generated based on the first automated manufacturing process performed by the first industrial tool and the second automated manufacturing process performed by the second industrial tool, wherein the first industrial tool and the second industrial tool are in communication with the controller component via a first network, wherein one or more parameters of the industrial data for the first automated manufacturing process and the second automated manufacturing process are updated as a function of adjusted industrial data associated with the data table of the spreadsheet application, wherein the data table is presented on a device in communication with the data interface component via a second network that is different than the first network, wherein first industrial data in the data table that corresponds to the first industrial tool is formatted with a first visual characteristic associated with a first group of the industrial data in the data table that is presented via a display of the device, and wherein second industrial data in the data table that corresponds to the second industrial tool is formatted with a second visual characteristic associated with a second group of the industrial data in the data table that is presented concurrently with the first group of the industrial data via the display of the device.

2. The system of claim 1, wherein the data interface component is configured to provide the spreadsheet application access to the nested data structure in response to a read command associated with the spreadsheet application.

3. The system of claim 1, wherein the data interface component is configured to generate a data file that maps the nested data structure configured in a first format to the data table configured in a second format.

4. The system of claim 3, wherein the data interface component is configured to determine the industrial data corresponding to the configuration data stored in the nested data structure for the data table associated with the spreadsheet application based on the data file.

5. The system of claim 1, wherein the data table is configured to display, using the device in communication with the data interface component via the second network that is different than the first network, the data corresponding to the configuration data as a function of at least the plurality of product types.

6. The system of claim 1, wherein the controller component is configured to update the configuration data stored in the nested data structure as a function of adjusted configuration data associated with the data table.

7. The system of claim 1, wherein the controller component is configured to obtain the configuration data from the first industrial tool and the second industrial tool in response to a write command associated with the spreadsheet application.

8. The system of claim 1, wherein the data interface component is configured to map each data field of the data table to a location associated with the nested data structure.

9. The system of claim 1, wherein the data interface component is configured to fill the data table associated with the spreadsheet application with the configuration data stored in the nested data structure as a function of the plurality of product types and configuration parameters associated with the configuration data.

10. The system of claim 1, wherein the spreadsheet application is implemented on the device.

11. The system of claim 1, wherein the controller component and the data interface component are associated with at least one server.

12. The system of claim 11, wherein the at least one server communicates with the device via the second network.

13. The system of claim 11, wherein the at least one server communicates with the device via an Ethernet communication protocol.

14. A method, comprising:

controlling, by a device comprising at least one processor, a first automated industrial process for a first industrial device and a second automated industrial process for a second industrial device;

receiving, by the device, process data from the first industrial device and the second industrial device via a network device, wherein the process data is associated with a plurality of processing requirements for a product that is generated using the first industrial device and the second industrial device, and wherein the process data is generated based the first automated industrial process and the second automated industrial process;

storing, by the device, the process data associated with the first automated industrial process and the second automated industrial process in a hierarchical data structure;

providing, by the device, a spreadsheet application that displays industrial data, corresponding to the process data and stored in the hierarchical data structure, access to the hierarchical data structure;

displaying, by the device, first industrial data in the spreadsheet application that corresponds to the first automated industrial process with a first visual characteristic associated with a first group of the industrial data in the data table that is presented via a display of the device;

displaying, by the device, second industrial data in the spreadsheet application that corresponds to the second automated industrial process with a second visual characteristic associated with a second group of the industrial data in the data table that is presented simultaneously with the first group of the industrial data via the display of the device; and updating, by the device, a portion of the first industrial data for the first automated industrial process or the second industrial data for the second automated industrial process as a function of adjusted industrial data associated with the data table of the spreadsheet application.

15. The method of claim 14, further comprising:
providing, by the device, a set of access permissions associated with the hierarchical data structure to the spreadsheet application in response to a read command associated with the spreadsheet application.

16. The method of claim 14, further comprising:
generating, by the device, a data file comprising mapping information for mapping the hierarchical data structure to the spreadsheet application.

17. The method of claim 16, further comprising:
filling, by the device, a data table associated with the spreadsheet application with the process data based on the mapping information stored in the data file.

18. The method of claim 14, further comprising:
updating, by the device, the process data stored in the hierarchical data structure as a function of adjusted process data associated with the spreadsheet application.

19. A non-transitory computer-readable medium having stored thereon instructions that, in response to execution, cause a device comprising a processor to perform operations, the operations comprising:
controlling a first automated industrial process for a first industrial device and a second automated industrial process for a second industrial device;
receiving, via a first network, industrial data associated with a plurality of product types for a product that is generated using the first industrial device and the second industrial device, wherein the industrial data is generated based on the first automated industrial process performed by the first industrial device and the second automated industrial process performed by the second industrial device;
storing the industrial data associated with the at first automated industrial process and the second automated industrial process in a hierarchical data structure;
managing tabular industrial data of a spreadsheet application that displays data, corresponding to the industrial data and stored in the hierarchical data structure, as a function of at least the plurality of product types, comprising transmitting the tabular data to a device via a second network;
formatting first tabular industrial data in the spreadsheet application that corresponds to the first industrial device with a first visual characteristic associated with a first group of the data in the spreadsheet application that is presented via a display of the device;
formatting second tabular industrial data in the spreadsheet application that corresponds to the second industrial device with a second visual characteristic associated with a second group of the data in the spreadsheet application that is presented concurrently with the first group of the data via the display of the device; and
modifying the industrial data for the first automated industrial process or the second automated industrial process as a function of adjusted tabular industrial data associated with the spreadsheet application.

20. The non-transitory computer-readable medium of claim 19, further comprising:
filling the tabular industrial data of the spreadsheet application with the industrial data associated with the hierarchical data structure as a function of at least the plurality of product types.

* * * * *